US012695536B2

(12) United States Patent
Jiang et al.

(10) Patent No.: US 12,695,536 B2
(45) Date of Patent: Jul. 28, 2026

(54) METHOD AND APPARATUS FOR COMMUNICATION IN MULTI-BEAM SCENARIOS

(71) Applicant: Apogee 5G Global, LLC, Plano, TX (US)

(72) Inventors: Qi Jiang, Shanghai (CN); Xiaobo Zhang, Shanghai (CN)

(73) Assignee: APOGEE 5G GLOBAL, LLC, Plano, TX (US)

( * ) Notice: Subject to any disclaimer, the term of this patent is extended or adjusted under 35 U.S.C. 154(b) by 344 days.

(21) Appl. No.: 17/979,784

(22) Filed: Nov. 3, 2022

(65) Prior Publication Data

US 2023/0055553 A1     Feb. 23, 2023

Related U.S. Application Data

(63) Continuation of application No. PCT/CN2021/100274, filed on Jun. 16, 2021.

(30) Foreign Application Priority Data

Jun. 19, 2020     (CN) ......................... 202010564602.5

(51) Int. Cl.
$H04L\ 1/00$          (2006.01)
$H04L\ 5/00$          (2006.01)
              (Continued)

(52) U.S. Cl.
CPC .......... *H04L 1/0003* (2013.01); *H04L 5/0051* (2013.01); *H04W 72/0446* (2013.01); *H04W 72/0453* (2013.01); *H04W 72/21* (2023.01)

(58) Field of Classification Search
CPC ... H04L 5/0048; H04L 5/0051; H04L 5/0023; H04L 1/0009; H04L 1/0003;
           (Continued)

(56) References Cited

U.S. PATENT DOCUMENTS

2020/0137780 A1   4/2020  Kim et al.
2020/0153586 A1   5/2020  Bai et al.
            (Continued)

FOREIGN PATENT DOCUMENTS

CN       109565429 A    4/2019
EP        3477885 A1    5/2019
            (Continued)

OTHER PUBLICATIONS

First office action of CN patent application No. 202010564602.5, dated May 9, 2022.

(Continued)

*Primary Examiner* — Brian D Nguyen
(74) *Attorney, Agent, or Firm* — VOLPE KOENIG

(57) ABSTRACT

A method and a device in a node used for wireless communications are disclosed in the present disclosure. A node transmits a first signal, a first reference signal and a second reference signal on a first channel; small-scale fading channel parameters experienced by the second reference signal are used to infer small-scale fading channel parameters experienced by the first signal; the first reference signal is associated with at least one antenna port of the second reference signal, a first MCS is used to determine time-domain density of the first reference signal, and the first MCS is different from an MCS employed by the first signal. The present disclosure associates an MCS to which the resource mapping of PTRS refers with an MCS employed by data, making it easier for the base station to acquire the mapping of PTRS in non-scheduling-based uplink transmission, thus enhancing the overall system performance.

20 Claims, 4 Drawing Sheets

(51) Int. Cl.

| | | |
|---|---|---|
| *H04W 72/04* | (2023.01) | |
| *H04W 72/0446* | (2023.01) | |
| *H04W 72/0453* | (2023.01) | |
| *H04W 72/21* | (2023.01) | |

(58) Field of Classification Search
CPC ....... H04L 5/0094; H04L 1/0023; H04L 1/18; H04W 72/21; H04W 72/0446
See application file for complete search history.

(56) References Cited

U.S. PATENT DOCUMENTS

| 2021/0211244 A1* | 7/2021 | Wu | ...................... H04L 5/001 |
|---|---|---|---|
| 2021/0345261 A1* | 11/2021 | Baldemair | ........... H04W 24/02 |
| 2021/0400555 A1* | 12/2021 | Park | ................ H04W 36/0077 |
| 2022/0248411 A1* | 8/2022 | Jung | ....................... H04B 7/06 |
| 2023/0180260 A1* | 6/2023 | Nogami | ............. H04W 72/231 |
| | | | 370/329 |

FOREIGN PATENT DOCUMENTS

| EP | 3570473 A2 | 11/2019 |
|---|---|---|
| WO | 2018125910 A1 | 7/2018 |
| WO | 2019051085 A1 | 3/2019 |

OTHER PUBLICATIONS

First Search Report of CN patent application No. 202010564602.5, dated Apr. 28, 2022.

<3GPP tsg_ran\wg4_radio> Moderator(Ericsson) "Email R4-2002381 discussion summary RAN4#94e#90_NR_Llenh_URLLC_Demod_Test" Feb. 27, 2020.

International search report of the patent application No. PCT/CN2021/100274, dated Oct. 11, 2021.

Supplementary search Report of CN patent application No. 202010564602.5, dated Aug. 27, 2022.

Notification to Grant Patent Right for invention of CN patent application No. 202010564602.5, dated Sep. 5, 2022.

Third Generation Partnership Project, "Technical Specification Group Radio Access Network; NR; Physical channels and modulation (Release 16)," 3GPP TS 38.211 V16.1.0 (Mar. 2020).

Third Generation Partnership Project, "Technical Specification Group Radio Access Network; NR; Multiplexing and channel coding (Release 16)," 3GPP TS 38.212 V16.1.0 (Mar. 2020).

Third Generation Partnership Project, "Technical Specification Group Radio Access Network; NR; Physical layer procedures for control (Release 16)," 3GPP TS 38.213 V16.1.0 (Mar. 2020).

Third Generation Partnership Project, "Technical Specification Group Radio Access Network; NR; Physical layer procedures for data (Release 16)," 3GPP TS 38.214 V16.1.0 (Mar. 2020).

Third Generation Partnership Project, "Technical Specification Group Radio Access Network; NR; NR and NG-RAN Overall Description; Stage 2 (Release 16)," 3GPP TS 38.300 V16.1.0 (Mar. 2020).

Third Generation Partnership Project, "Technical Specification Group Radio Access Network; NR; Radio Resource Control (RRC) protocol specification (Release 16)," 3GPP TS 38.331 V16.0.0 (Mar. 2020).

\* cited by examiner

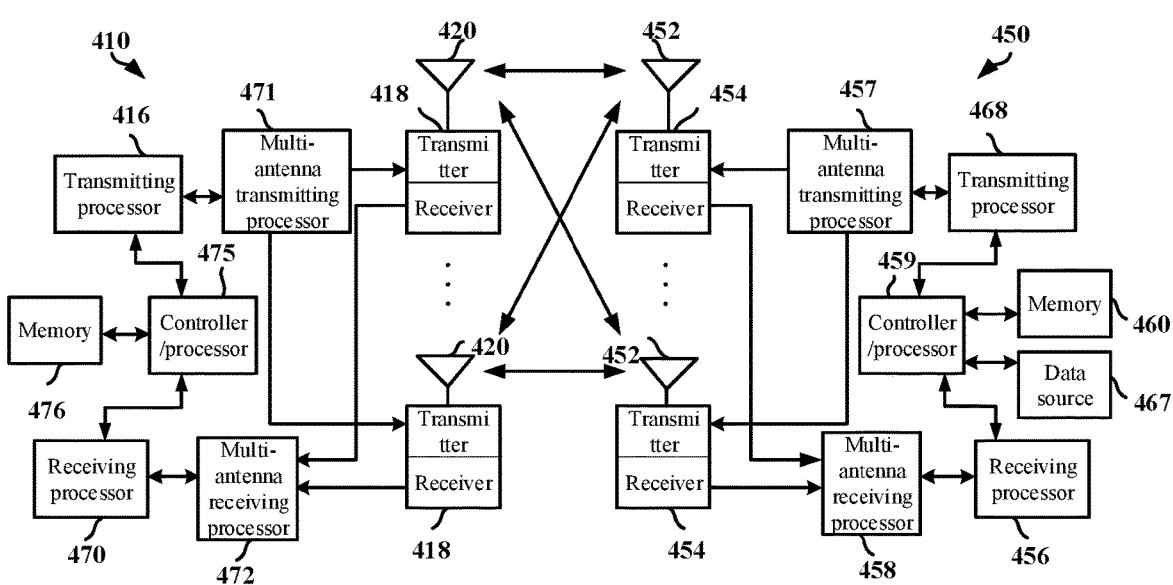
FIG. 4
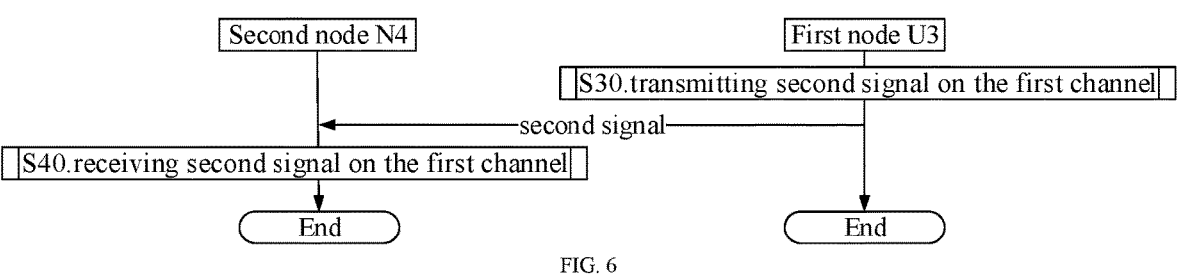
FIG. 5
FIG. 6

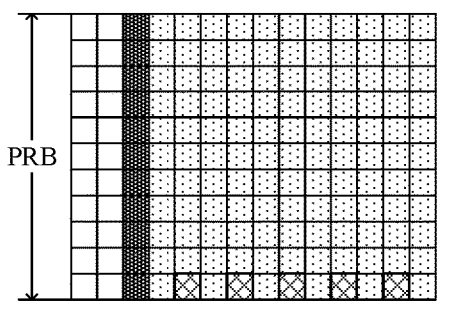
■  RE occupied by second reference signal
⊠  RE occupied by first reference signal
▦  RE occupied by first signal
FIG. 7
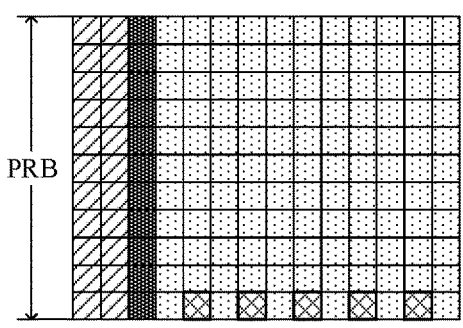
■  RE occupied by second reference signal
⊠  RE occupied by first reference signal
▦  RE occupied by first signal
▨  RE occupied by second signal
FIG. 8
Q1 first-type beamforming vectors
FIG. 9
*Q1 Modulation Coding Schemes*                    *Q1 candidate parameters*
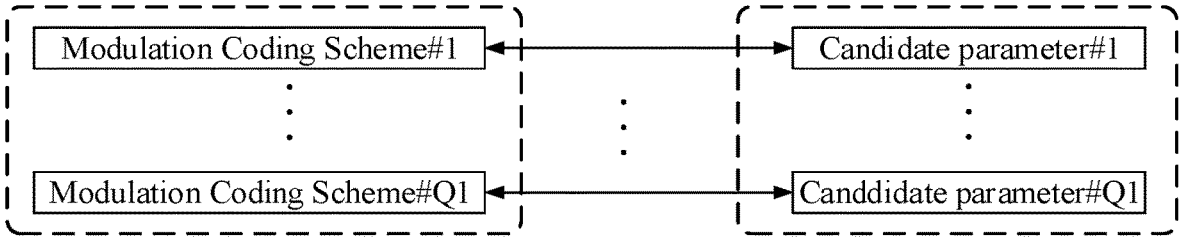
FIG. 10

Sub-monitoring#1

Sub-monitoring#i

Sub-monitoring#Q1

Q1 spatial Rx parameters

1200

First node

First receiver1201

First transceiver1202

1300

Second node

First transmitter1301

Second transceiver1302

METHOD AND APPARATUS FOR COMMUNICATION IN MULTI-BEAM SCENARIOS

CROSS REFERENCE TO RELATED APPLICATIONS

This application is a continuation of International Application No. PCT/CN2021/100274, filed Jun. 16, 2021, which claims the priority benefit of Chinese Patent Application No. 202010564602.5, filed on Jun. 19, 2020 the full disclosure of which is incorporated herein by reference.

TECHNICAL FIELD

The present disclosure relates to transmission methods and devices in wireless communication systems, and in particular to a scheme and device of multi-antenna related transmission in wireless communication.

BACKGROUND

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

A key technology of NR is to support beam-based signal transmission, which is mainly applied in the scenario of enhancing the coverage of an NR device working in a millimeter wave band, such as a band larger than 6 GHz. In a traditional cellular system, data transmission only occurs on Licensed Spectrum, however, as traffic demands grow rapidly, especially in some urban areas, the Licensed Spectrum may hardly meet the demands of traffic amount, so that 3GPP Release 17 began to consider extending the NR application to Unlicensed Spectrum beyond 52.6 GHz. In order to ensure the compatibility with other access technologies on Unlicensed Spectrum, the technique of Listen Before Talk (LBT) is employed to avoid interference caused by multiple transmitters occupying the same frequency resources simultaneously. For Unlicensed Spectrum above 52.6 GHz, due to the apparent directivity of beam-based signal transmission, it will be more appropriate to use the technique of Directional LBT to avoid such interference.

Meanwhile, for the purpose of offsetting the phase noise introduced by local crystal oscillation between a base station and a terminal, the Phase Tracking Reference Signal (PTRS) is introduced in the NR system to serve as an extension of Demodulation Reference Signal (DMRS). Since the time-domain density of the PTRS is dependent on the quality of link transmission between the terminal and base station, the time-domain density of the PTRS is also related to the level of a Modulation and Coding Scheme (MCS) employed by a data channel. when the data channel transmission is based on Grant-Free and the data channel itself is transmitted on the multi-beam supporting Unlicensed Spectrum, the design of the above PTRS needs to be revised.

SUMMARY

In the Grant-Free scenario, an uplink transmission of a terminal does not need to be scheduled by a base station, and the base station is capable of pre-defining one or more Modulation and Coding Schemes (MCS) for the terminal to select from. If the terminal can transmit on multiple beams, the multiple beams correspond to a plurality of MCS selections. And then, when the terminal selects an MCS on its own, there will be some hidden risks behind PTRS mapping on the base station side, according to the current rules and standards.

To satisfy the requests of above application scenarios, the present disclosure provides a solution. It should be noted that if no conflict is incurred, the embodiments of the first node in the present disclosure and the characteristics of the embodiments can be applied to a base station, and the embodiments of the second node in the present disclosure and the characteristics of the embodiments can be applied to a terminal. And the embodiments in the present disclosure and the characteristics of the embodiments can be arbitrarily combined if there is no conflict.

Furthermore, though originally targeted at the scenario of Unlicensed Spectrum, the present disclosure is also applicable to the scenario of Licensed Spectrum. Though originally targeted at the multi-beam scenario of massive MIMO, the present disclosure is also applicable to the scenario of non-massive MIMO, where similar effects can be achieved. Apart from that, the adoption of a unified solution for various scenarios, including but not limited to terminal-base station communication scenario, contributes to the reduction of hardcore complexity and costs.

The present disclosure provides a method in a first node for wireless communication, comprising:

transmitting a first signal, a first reference signal and a second reference signal on a first channel;

herein, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, a technical feature of the above method is to associate an MCS employed by the first signal with an MCS used for determining time-domain mapping of the first reference signal, thus ensuring that the mapping mode of the first reference signal in time domain is knowable to the receiver side of the first signal while guaranteeing the flexibility of the MCS employed by the first signal to a certain extent.

According to one aspect of the present disclosure, comprising:

transmitting a second signal on the first channel; the first MCS is an MCS employed by the second signal.

In one embodiment, a technical feature of the above method is that the second signal is used for assisting with transmission of the first signal, and a receiver of the first signal has to demodulate the second signal before receiving the first signal, so that an MCS employed by the second signal needs to be acquired by the receiver of the first signal in advance.

According to one aspect of the present disclosure, the second signal occupies a time-frequency resource other than a time-frequency resource occupied by the first reference signal, and the small-scale fading channel parameters experienced by the second reference signal are used to infer the small-scale fading channel parameters experienced by the second signal.

In one embodiment, a technical feature of the above method is that the second reference signal is used for demodulating the second signal for the purpose of enhancing the reception performance of the second signal.

According to one aspect of the present disclosure, comprising:

receiving a first information block;

herein, the first information block indicates Q1 candidate parameters, and the Q1 candidate parameters are configured for the first channel; a first candidate parameter is one of the Q1 candidate parameters, and the first candidate parameter is used to transmit the first reference signal and the first signal; the Q1 candidate parameters are associated with Q1 MCSs respectively; at least one of the Q1 MCSs is the same as the first MCS, Q1 being a positive integer greater than 1.

In one embodiment, a technical feature of the above method is that a base station configures the Q1 candidate parameters for the first channel, which is equivalent to configuring multiple beams for the first channel And the first node will transmit the first signal on a beam that has passed LBT according to an actual result of the LBT, thus increasing the chance of transmission under Unlicensed Spectrum.

According to one aspect of the present disclosure, the first MCS is one of the Q1 MCSs being associated with the first candidate parameter.

In one embodiment, a technical feature of the above method is that the first node determines the first MCS based on a beam direction that passes LBT, and then determines the time-domain density of the first reference signal.

According to one aspect of the present disclosure, among the Q1 MCSs there isn't any MCS with higher MCS index than the first MCS.

In one embodiment, a technical feature of the above method is that the first MCS is an MCS with a highest index among the Q1 MCSs, which makes it easier for the base station to determine the time-domain density of the first reference signal.

According to one aspect of the present disclosure, comprising:

performing a first monitoring on a first sub-band;

herein, the first monitoring is used to determine that the first channel can be used to transmit a radio signal, the first channel belonging to the first sub-band in frequency domain.

In one embodiment, a technical feature of the above method is that the result of LBT on the side of the first node is used to determine the first candidate parameter, which in turn determines a beam actually transmitted by the first signal.

According to one aspect of the present disclosure, the Q1 candidate parameters are respectively associated with Q1 candidate MCS sets, and the Q1 MCSs are respectively MCSs with maximum indexes comprised in the Q1 candidate MCS sets.

In one embodiment, a technical feature of the above method is that the LBT result at the first node is used to determine the first candidate parameter, which in turn determines a beam actually transmitted by the first signal.

According to one aspect of the present disclosure, the first candidate parameter is used to determine a first candidate MCS set out of the Q1 candidate MCS sets, the first candidate MCS set comprises the MCS employed by the first signal, and the second signal is used to indicate the MCS employed by the first signal out of the first candidate MC S set.

In one embodiment, a technical feature of the above method is that the second signal can indicate an MCS employed by the first signal in a dynamic manner, thereby guaranteeing the flexibility of transmission.

The present disclosure provides a method in a second node for wireless communications, comprising:

receiving a first signal, a first reference signal and a second reference signal on a first channel;

herein, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

According to one aspect of the present disclosure, comprising:

receiving a second signal on the first channel;

herein, the first MCS is an MCS employed by the second signal.

According to one aspect of the present disclosure, the second signal occupies a time-frequency resource other than a time-frequency resource occupied by the first reference signal, and the small-scale fading channel parameters experienced by the second reference signal are used to infer the small-scale fading channel parameters experienced by the second signal.

According to one aspect of the present disclosure, comprising:

transmitting a first information block;

herein, the first information block indicates Q1 candidate parameters, and the Q1 candidate parameters are configured for the first channel; a first candidate parameter is one of the Q1 candidate parameters, and the first candidate parameter is used to transmit the first reference signal and the first signal; the Q1 candidate parameters are associated with Q1 MCSs respectively; at least one of the Q1 MCSs is the same as the first MCS, Q1 being a positive integer greater than 1.

According to one aspect of the present disclosure, the first MCS is one of the Q1 MCSs being associated with the first candidate parameter.

According to one aspect of the present disclosure, among the Q1 MCSs there isn't any MCS with higher MCS index than the first MCS.

According to one aspect of the present disclosure, comprising:

performing a second monitoring in a first sub-band;

herein, the second monitoring is used to determine the first candidate parameter, the first candidate parameter is used for reception of the first channel, and the first channel belongs to the first sub-band in frequency domain.

According to one aspect of the present disclosure, the Q1 candidate parameters are respectively associated with Q1 candidate MCS sets, and the Q1 MCSs are respectively MCSs with maximum indexes comprised in the Q1 candidate MCS sets.

According to one aspect of the present disclosure, the first candidate parameter is used to determine a first candidate MCS set out of the Q1 candidate MCS sets, the first candidate MCS set comprises the MCS employed by the first signal, and the second signal is used to indicate the MCS employed by the first signal out of the first candidate MCS set.

The present disclosure provides a first node for wireless communication, comprising:

a first transceiver, transmitting a first signal, a first reference signal and a second reference signal on a first channel;

herein, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

The present disclosure provides a second node for wireless communications, comprising:

a second transceiver, receiving a first signal, a first reference signal and a second reference signal on a first channel;

herein, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, the present disclosure is advantageous over the prior art in the following aspects:

By associating an MCS employed by the first signal with an MCS used for determining the time-domain mapping of the first reference signal, the flexibility of the MCS employed by the first signal can be guaranteed to some extent, so that the mapping mode of the first reference signal in time domain is knowable on the receiver side of the first signal.

The second signal is used for assisting with transmission of the first signal, and a receiver of the first signal is required to demodulate the second signal before receiving the first signal, therefore, an MCS employed by the second signal shall be known to the receiver of the first signal in advance.

A base station configures Q1 candidate parameters for the first channel, that is, configuring multiple beams for the first channel And, in accordance with the actual LBT result, the first node transmits the first signal on a beam which passed LBT, thus raising the chance of transmission under Unlicensed Spectrum.

The LBT result on the first node side is used to determine the first candidate parameter, which then is used to determine a beam actually transmitted by the first signal; or, an MCS to which the time-domain density of the first reference signal refers is an MCS with a maximum index in a corresponding candidate MCS set, so as to make sure that the time-domain density of the first reference signal is higher. This is a conservative way to ensure the adequacy of time-domain density of the first reference signal for fulfilling performance demands.

BRIEF DESCRIPTION OF THE DRAWINGS

Other features, objects and advantages of the present disclosure will become more apparent from the detailed description of non-restrictive embodiments taken in conjunction with the following drawings:

FIG. 4 illustrates a schematic diagram of a first communication device and a second communication device according to one embodiment of the present disclosure.

FIG. 5 illustrates a flowchart of a first signal according to one embodiment of the present disclosure.

FIG. 6 illustrates a flowchart of a second signal according to one embodiment of the present disclosure.

FIG. 7 illustrates a schematic diagram of a first reference signal, a second reference signal and a first signal according to another embodiment of the present disclosure.

FIG. 8 illustrates a schematic diagram of a second signal according to one embodiment of the present disclosure.

FIG. 9 illustrates a schematic diagram of Q1 candidate parameters according to one embodiment of the present disclosure.

FIG. 10 illustrates a schematic diagram of Q1 MCSs according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
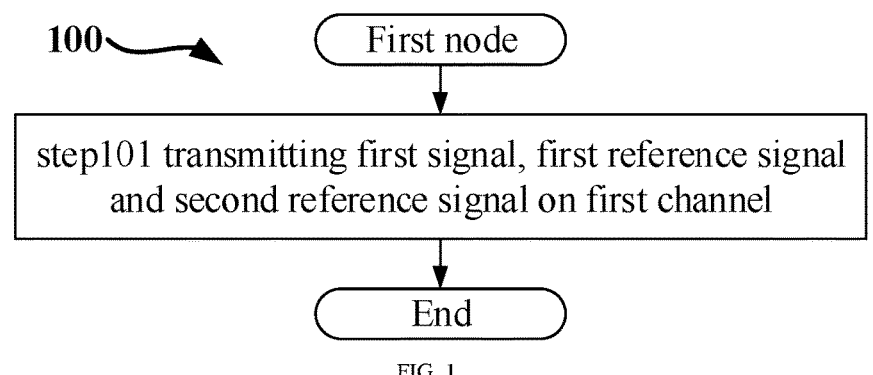
FIG. 1 illustrates a flowchart of processing of a first node according to one embodiment of the present disclosure.

Embodiment 1 illustrates a flowchart of processing of a first node, as shown in FIG. 1. In 100 illustrated by the figure, each box represents a step. In Embodiment 1, the first node in the present disclosure transmits a first signal, a first reference signal and a second reference signal on a first channel in step 101.

In Embodiment 1, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, a physical layer channel bearing the first signal includes a Physical Uplink Shared Channel (PUSCH).

In one embodiment, a transmission channel bearing the first signal includes an Uplink Shared Channel (UL-SCH).

In one embodiment, a physical layer channel bearing the first signal includes a Physical Downlink Shared Channel (PDSCH).

In one embodiment, a transmission channel bearing the first signal includes a Downlink Shared Channel (DL-SCH).

In one embodiment, a first bit block is used to generate the first signal.

In one subembodiment of the above embodiment, the first bit block is a Transmission Block (TB).

In one subembodiment of the above embodiment, the first bit block is a Code Block (CB).

In one subembodiment of the above embodiment, the first bit block is a Code Block Group (CBG).

In one embodiment, the first reference signal is a PTRS.

In one embodiment, the first reference signal comprises a PTRS.

In one embodiment, the second reference signal is a DMRS.

In one embodiment, the second reference signal comprises a DMRS.

In one embodiment, the first reference signal comprises a Channel State Information Reference Signal (CSI-RS).

In one embodiment, the second reference signal comprises a Sounding Reference Signal (SRS).

In one embodiment, the first channel is a PUSCH.

In one embodiment, the first channel is a Physical Sidelink Shared Channel (PSSCH).

In one embodiment, the first channel is a PDSCH.

In one embodiment, the first channel only bears the first signal, the first reference signal and the second reference signal.

In one embodiment, of all signals borne by the first channel only the first signal is mapped to a Transport Channel.

In one embodiment, the first signal only comprises a Codeword; the first reference signal is associated with an antenna port with a lowest index of all antenna ports of the second reference signal.

In one embodiment, the first signal only comprises two Codewords of a same MCS; the first reference signal is associated with an antenna port with a lowest index of all antenna ports of the second reference signal.

In one embodiment, the first signal only comprises two Codewords of different MCSs; the first reference signal is associated with an antenna port with a lowest index in a first antenna port subset; the first antenna port subset is composed of antenna ports among all antenna ports of the second reference signal, which are used for transmitting a Codeword of a higher MCS between the two Codewords of different MCSs.

In one embodiment, the first reference signal is transmitted by the at least one antenna port being associated with the first reference signal.

In one embodiment, the first reference signal and the at least one antenna port being associated with the first reference signal are Quasi Co-Located (QCL).

In one embodiment, the first reference signal and the at least one antenna port being associated with the first reference signal are QCL, with the QCL type being QCL Type A.

In one embodiment, the first reference signal and the at least one antenna port being associated with the first reference signal are QCL, with the QCL type being QCL Type D.

In one embodiment, the phrase that "small-scale fading channel parameters experienced by the second reference signal are used to infer small-scale fading channel parameters experienced by the first signal" includes a meaning that the second reference signal is used for demodulation of the first signal.

In one embodiment, the phrase that "small-scale fading channel parameters experienced by the second reference signal are used to infer small-scale fading channel parameters experienced by the first signal" includes a meaning that the second reference signal is used for channel estimation of the first signal.

In one embodiment, the phrase that "small-scale fading channel parameters experienced by the second reference signal are used to infer small-scale fading channel parameters experienced by the first signal" includes a meaning that the second reference signal is used for decoding of the first signal.

In one embodiment, the phrase that "the first reference signal is associated with at least one antenna port of the second reference signal" includes a meaning that the second reference signal corresponds to multiple antenna ports, and an antenna port employed for transmitting the first reference signal is one of the multiple antenna ports corresponding to the second reference signal.

In one embodiment, the phrase that "the first reference signal is associated with at least one antenna port of the second reference signal" includes a meaning that the second reference signal corresponds to multiple antenna ports, the first signal employs single codeword for transmission, and an antenna port employed for transmission of the first reference signal is an antenna port with a lowest index value among the multiple antenna ports corresponding to the second reference signal.

In one embodiment, the phrase that "the first reference signal is associated with at least one antenna port of the second reference signal" includes a meaning that the second reference signal corresponds to multiple antenna ports, the first signal employs two codewords for transmission, and an antenna port employed for transmission of the first reference signal is an antenna port associated with a lowest index value corresponding to a codeword of a highest MCS among the multiple antenna ports corresponding to the second reference signal.

In one embodiment, the phrase that "the first reference signal is associated with at least one antenna port of the second reference signal" includes a meaning that the second reference signal corresponds to multiple antenna ports, the first signal employs two identical codewords for transmission, and an antenna port employed for transmission of the first reference signal is an antenna port associated with a lowest index value corresponding to a first codeword among the multiple antenna ports corresponding to the second reference signal.

In one embodiment, the phrase that "a first Modulation and Coding Scheme (MCS) is used to determine time-domain density of the first reference signal" includes a meaning that the first MCS is used to determine that the first reference signal is configured on one out of every L Orthogonal Frequency Division Multiplexing (OFDM) symbol(s); L is a positive integer.

In one subembodiment, the L is one of numbers 1, 2 and 4.

In one subembodiment, an MCS index corresponding to the first MCS is smaller than ptrs-MCS1, and the first reference signal is not configured.

In one subembodiment, an MCS index corresponding to the first MCS is smaller than ptrs-MCS2 and no smaller than ptrs-MCS1, L being equal to 4.

In one subembodiment, an MCS index corresponding to the first MCS is smaller than ptrs-MCS3 and no smaller than ptrs-MCS2, L being equal to 2.

In one subembodiment, an MCS index corresponding to the first MCS is smaller than ptrs-MCS4 and no smaller than ptrs-MCS3, L being equal to 1.

In one subembodiment, the ptrs-MCS1 is an MCS index.

In one subembodiment, the ptrs-MCS2 is an MCS index.

In one subembodiment, the ptrs-MCS3 is an MCS index.

In one subembodiment, the ptrs-MCS4 is an MCS index.

In one embodiment, the phrase that "a first Modulation and Coding Scheme (MCS) is used to determine time-domain density of the first reference signal" includes a meaning that the first Modulation and Coding Scheme is used to determine how many OFDM symbols are configured with the first reference signal in each slot.

In one embodiment, the first Modulation and Coding Scheme is an MCS.

In one embodiment, frequency-domain resources occupied by the first channel are between 450 MHz and 6 GHz.

In one embodiment, frequency-domain resources occupied by the first channel are between 24.25 GHz and 52.6 GHz.

Embodiment 2

Figure 2:
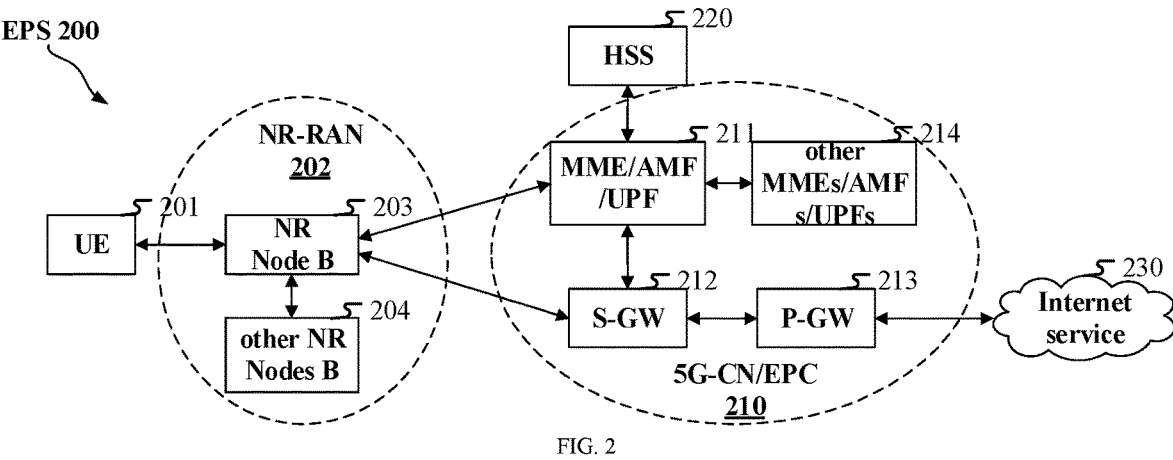
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or other appropriate terms, which may comprise one or more UEs 201, an NG-RAN 202, an Evolved Packet Core/5G Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports Multi-Panel wireless transmission.

In one embodiment, the UE 201 supports wireless communications on Unlicensed Spectrum.

In one embodiment, the UE 201 supports wireless communications on multiple beams simultaneously.

In one embodiment, the UE 201 supports Grant-Free based uplink transmission.

In one embodiment, the UE 201 supports independent LBTs performed simultaneously on multiple beams.

In one embodiment, the UE 201 supports transmission in Frequency Range 2 (FR2).

In one embodiment, the gNB 203 corresponds to the second node in the present disclosure.

In one embodiment, the gNB 203 supports Multi-Panel wireless transmission.

In one embodiment, the gNB 203 supports wireless communications on Unlicensed Spectrum.

In one embodiment, the gNB 203 supports wireless communications on multiple beams simultaneously.

In one embodiment, the gNB 203 supports Grant-Free based uplink transmission.

In one embodiment, the gNB 203 supports independent LBTs performed simultaneously on multiple beams.

In one embodiment, an air interface between the UE 201 and the gNB 203 is a Uu interface.

In one embodiment, a radio link between the UE 201 and the gNB 203 is a cellular link.

In one embodiment, the first node in the present disclosure is a terminal in the coverage of the gNB 203.

Embodiment 3

Figure 3:
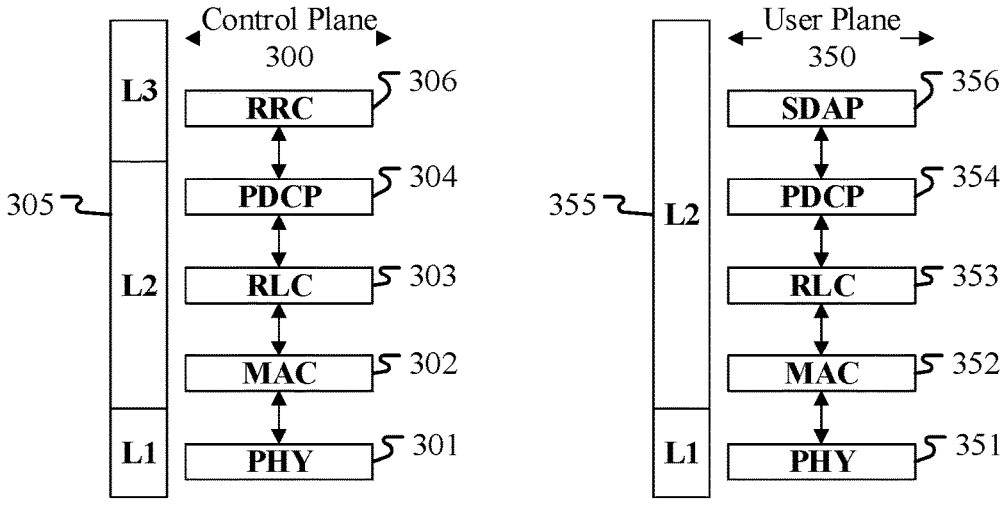
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 in the second communication node is used for generating scheduling of the first communication node.

In one embodiment, the PDCP 354 in the second communication node is used for generating scheduling of the first communication node.

In one embodiment, the first signal in the present disclosure is generated by the PHY 301 or the PHY 351.

In one embodiment, the first signal in the present disclosure is generated by the MAC 302 or the MAC 352.

In one embodiment, the first signal in the present disclosure is generated by the RRC 306.

In one embodiment, the first reference signal in the present disclosure is generated by the PHY 301 or the PHY 351.

In one embodiment, the first reference signal in the present disclosure is generated by the MAC 302 or the MAC 352.

In one embodiment, the second reference signal in the present disclosure is generated by the PHY 301 or the PHY 351.

In one embodiment, the second reference signal in the present disclosure is generated by the MAC 302 or the MAC 352.

In one embodiment, the second signal in the present disclosure is generated by the PHY 301 or the PHY 351.

In one embodiment, the second signal in the present disclosure is generated by the MAC 302 or the MAC 352.

In one embodiment, the first information block in the present disclosure is generated by the RRC 306.

In one embodiment, the first information block in the present disclosure is generated by the MAC 302 or the MAC 352.

In one embodiment, the second node in the present disclosure is terminal equipment.

In one embodiment, the first node in the present disclosure is terminal equipment.

In one embodiment, the first node and the second node are in Vehicle-to-Everything (V2X) communication with each other.

Embodiment 4

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least transmits a first signal, a first reference signal and a second reference signal on a first channel; small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, the first communication device 450 comprises a memory that stores a computer readable instruction program. The computer readable instruction program generates an action when executed by at least one processor. The action includes: transmitting a first signal, a first reference signal and a second reference signal on a first channel; small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, the second communication device 410 comprises at least one processor and at least one memory. The at least one memory comprises computer program codes. The at least one memory and the computer program codes are configured to be used in collaboration with the at least one processor. The second communication device 410 at least receives a first signal, a first reference signal and a second reference signal on a first channel; small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, the second communication device 410 comprises a memory that stores a computer readable instruction program. The computer readable instruction program generates an action when executed by at least one processor. The action includes: receiving a first signal, a first reference signal and a second reference signal on a first channel; small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a network device.

In one embodiment, at least the first four of the antenna 452, the transmitter 454, the multi-antenna transmitting processor 457, the transmitting processor 468 and the controller/processor 459 are used for transmitting a first signal, a first reference signal and a second reference signal on a first channel; at least the first four of the antenna 420, the receiver 418, the multi-antenna receiving processor 472, the receiving processor 470 and the controller/processor 475 are used for receiving the first signal, the first reference signal and the second reference signal on the first channel.

In one embodiment, at least the first four of the antenna 452, the transmitter 454, the multi-antenna transmitting processor 457, the transmitting processor 468 and the controller/processor 459 are used for transmitting a second signal; at least the first four of the antenna 420, the receiver 418, the multi-antenna receiving processor 472, the receiving processor 470 and the controller/processor 475 are used for receiving the second signal.

In one embodiment, at least the first four of the antenna 452, the receiver 454, the multi-antenna receiving processor 458, the receiving processor 456 and the controller/processor 459 are used for receiving a first information block; at least the first four of the antenna 420, the transmitter 418, the multi-antenna transmitting processor 471, the transmitting processor 416 and the controller/processor 475 are used for transmitting the first information block.

In one embodiment, at least the first four of the antenna 452, the receiver 454, the multi-antenna receiving processor 458, the receiving processor 456 and the controller/processor 459 are used for performing a first monitoring on a first sub-band.

at least the first four of the antenna 420, the receiver 418, the multi-antenna receiving processor 472, the receiving processor 470 and the controller/processor 475 are used for performing a second monitoring on a first sub-band.

Embodiment 5

Embodiment 5 illustrates a flowchart of a first signal, as shown in FIG. 5. In FIG. 5, a first node U1 and a second node N2 are in communication through a radio link. It should be particularly noted that the sequence of embodiments illustrated in the Embodiment 5 does not limit the order of how signal transmissions and implementations are arranged in the present disclosure. If there is not conflict, embodiments and subembodiments provided in the Embodiment 5 can also be applied in the Embodiment 6, and vice versa; embodiments, subembodiments and subsidiary embodiments of the Embodiment 6 can be utilized in the Embodiment 5.

The first node U1 receives a first information block in step S10, performs a first monitoring on a first sub-band in step S11; and transmits a first signal, a first reference signal and a second reference signal on a first channel in step S12.

The second node N2 transmits a first information block in step S20, performs a second monitoring on a first sub-band in step S21; and receives a first signal, a first reference signal and a second reference signal on a first channel in step S22.

In Embodiment 5, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal; the first information block indicates Q1 candidate parameters, and the Q1 candidate parameters are configured for the first channel; a first candidate parameter is one of the Q1 candidate parameters, and the first candidate parameter is used to transmit the first reference signal and the first signal; the Q1 candidate parameters are associated with Q1 MCSs respectively; at least one of the Q1 MCSs is the same as the first MCS, Q1 being a positive integer greater than 1; the first monitoring is used to determine that the first channel can be used to transmit a radio signal, the first channel belonging to the first sub-band in frequency domain; the second monitoring is used to determine the first candidate parameter, the first candidate parameter being used by the second node N2 for reception of the first channel.

In one embodiment, the Q1 is equal to 2.

In one embodiment, the first signal is a Grant-Free based transmission.

In one embodiment, transmitting the first signal is not indicated by a physical layer dynamic signaling.

In one embodiment, the transmission of the first signal is not dependent on a UL Grant.

In one embodiment, the transmission of the first signal is not dependent on a DL Grant.

In one embodiment, the transmission of the first signal is not dependent on Sidelink Control Information (SCI).

In one embodiment, the first node U1 autonomously selects the first candidate parameter out of the Q1 candidate parameters.

In one embodiment, each of the Q1 candidate parameters comprises a spatial filter parameter.

In one embodiment, each of the Q1 candidate parameters comprises a multi-antenna related parameter.

In one embodiment, each of the Q1 candidate parameters comprises an analog beamforming parameter.

In one embodiment, each of the Q1 candidate parameters comprises a digital beamforming parameter.

In one embodiment, the Q1 candidate parameters are respectively Q1 Transmission Configuration Indication-States (TCI-States).

In one embodiment, the Q1 candidate parameters are respectively Q1 TCI-State IDs.

In one embodiment, the Q1 candidate parameters are respectively associated with Q1 candidate signals.

In one subembodiment, at least one of the Q1 candidate signals comprises a SS/PBCH Block (SSB).

In one subembodiment, at least one of the Q1 candidate signals comprises a CSI-RS.

In one subembodiment, at least one of the Q1 candidate signals comprises a Sounding Reference Signal (SRS).

In one subembodiment, at least one of the Q1 candidate signals occupies an SSB resource.

In one subembodiment, at least one of the Q1 candidate signals occupies a CSI-RS resource.

In one subembodiment, at least one of the Q1 candidate signals comprises an SRS resource.

In one subembodiment, at least one of the Q1 candidate signals is transmitted on an SSB resource.

In one subembodiment, at least one of the Q1 candidate signals is transmitted on a CSI-RS resource.

In one subembodiment, at least one of the Q1 candidate signals is transmitted on an SRS resource.

In one embodiment, any one of the Q1 candidate parameters is associated with a candidate signal.

In one subembodiment, the candidate signal comprises an SSB.

In one subembodiment, the candidate signal comprises a CSI-RS.

In one subembodiment, the candidate signal comprises an SRS.

In one subembodiment, the candidate signal occupies an SSB resource.

In one subembodiment, the candidate signal occupies a CSI-RS resource.

In one subembodiment, the candidate signal occupies an SRS resource.

In one subembodiment, the candidate signal is transmitted on an SSB resource.

In one subembodiment, the candidate signal is transmitted on a CSI-RS resource.

In one subembodiment, the candidate signal is transmitted on an SRS resource.

In one embodiment, the Q1 Modulation and Coding Schemes are Q1 MCSs, respectively.

In one embodiment, the first information block is borne by a Radio Resource Control (RRC) signaling.

In one embodiment, the first information block is borne by a Medium Access Control (MAC) Control Element (CE).

In one embodiment, the first information block comprises one or more fields in ConfiguredGrantConfig in TS 38.331.

In one embodiment, the first information block comprises one or more fields in ConfiguredGrantConfigIndex in TS 38.331.

In one embodiment, the first information block comprises one or more fields in ConfiguredGrantConfigIndexMAC in TS 38.331.

In one embodiment, the first information block comprises one or more fields in ConfiguredGrantConfigList in TS 38.331.

In one embodiment, the first information block comprises one or more fields in SL-ConfiguredGrantConfig in TS 38.331.

In one embodiment, the first Modulation and Coding Scheme is one of the Q1 MCSs being associated with the first candidate parameter.

In one subembodiment, the first node U1 autonomously determines the first candidate parameter out of the Q1 candidate parameters.

In one subembodiment, the first candidate parameter is used for determining the first Modulation and Coding Scheme out of the Q1 MCSs.

In one embodiment, among the Q1 MCSs there isn't any MCS with higher MCS index than the first MCS.

In one subembodiment, the first Modulation and Coding Scheme (MCS) is a supreme MCS among the Q1 MCSs.

In one subembodiment, the Q1 MCSs respectively correspond to Q1 first-type indexes, and the first Modulation and Coding Scheme (MCS) is an MCS corresponding to a maximum first-type index of the Q1 first-type indexes.

In one subembodiment, the first Modulation and Coding Scheme (MCS) is an MCS with a highest code rate among the Q1 MCSs.

In one subembodiment, the first Modulation and Coding Scheme (MCS) is an MCS with a highest modulation order among the Q1 MCSs.

In one embodiment, the first sub-band belongs to Unlicensed Spectrum.

In one embodiment, the first sub-band is a Component Carrier (CC).

In one embodiment, the first sub-band is a carrier.

In one embodiment, the first sub-band is a Bandwidth Part (BWP).

In one embodiment, the first sub-band is a Subchannel.

In one embodiment, the first sub-band is a frequency-domain resource occupied by a positive integer number of consecutive PRBs.

In one embodiment, the first monitoring is performed on Q1 beams respectively corresponding to the Q1 candidate parameters.

In one embodiment, the Q1 candidate parameters respectively correspond to Q1 candidate reference signals, and the first monitoring is performed on the Q1 candidate reference signals.

In one embodiment, the Q1 candidate parameters respectively correspond to Q1 antenna ports, and the first monitoring is performed on the Q1 antenna ports.

In one embodiment, the first node U1 comprises Q1 panels, the Q1 candidate parameters respectively correspond to Q1 candidate reference signals, and the Q1 panels perform LBTs respectively on the Q1 candidate reference signals.

In one embodiment, the first node U1 comprises Q1 panels, the Q1 candidate parameters respectively correspond to Q1 beams, and the Q1 panels perform LBTs respectively on the Q1 beams.

In one subembodiment, the Q1 panels respectively perform Q1 LBTs on the Q1 beams in an independent manner.

In one subembodiment, LBTs on the Q1 beams are performed collectively.

In one embodiment, the first monitoring is used to determine the first candidate parameter out of the Q1 candidate parameters, the first candidate parameter being used to transmit the first reference signal and the first signal.

In one embodiment, the first monitoring comprises LBT.

In one embodiment, the first monitoring comprises Channel Sensing.

In one embodiment, the first monitoring comprises energy detection.

In one embodiment, the first monitoring comprises coherent detection.

In one embodiment, the first monitoring comprises blind detection.

In one embodiment, the second monitoring comprises Channel Sensing.

In one embodiment, the second monitoring comprises energy detection.

In one embodiment, the second monitoring comprises coherent detection.

In one embodiment, the second monitoring comprises blind detection.

In one embodiment, the first channel occupies a first time-frequency resource set, before performing a second monitoring, the second node N2 is not aware of whether there is a signal being transmitted in the first time-frequency resource set.

In one embodiment, the second monitoring is used to determine a spatial Rx parameter employed by the second node N2 in a first time-frequency resource set, the first channel occupying the first time-frequency resource set.

In one embodiment, the second node N2 comprises Q1 panels, the Q1 candidate parameters respectively correspond to Q1 spatial Rx parameters, and the second monitoring comprises monitorings performed by the Q1 panels respectively on the Q1 spatial Rx parameters.

In one subembodiment, the Q1 spatial Rx parameters respectively correspond to Q1 beams, and the Q1 panels perform monitorings respectively on the Q1 beams.

In one subembodiment, the Q1 panels respectively perform Q1 monitorings on the Q1 beams in an independent manner.

In one embodiment, the Q1 candidate parameters are respectively associated with Q1 candidate MCS sets, and the Q1 MCSs are respectively MCSs with maximum indexes comprised in the Q1 candidate MCS sets.

In one subembodiment, the Q1 MCSs are respectively MCSs employing highest code rates comprised in the Q1 candidate MCS sets.

In one subembodiment, the Q1 MCSs are respectively MCSs employing highest orders of modulation comprised in the Q1 candidate MCS sets.

In one subembodiment, there is at least one candidate MCS set among the Q1 candidate MCS sets that comprises more than one MCS.

In one subembodiment, a given candidate MCS set is any one of the Q1 candidate MCS sets, and the given candidate MCS set comprises more than MCS.

In one subembodiment, a given candidate MCS set is any one of the Q1 candidate MCS sets, and the given candidate MCS set comprises more than K1 MCSs, K1 being greater than 1, the given candidate MCS set corresponds to a given MCS of the Q1 MCSs, the K1 MCSs correspond to K1 indexes respectively, and the given MCS is an MCS corresponding to a maximum index among the K1 indexes.

Embodiment 6

Embodiment 6 illustrates a flowchart of a second signal, as shown in FIG. 6. In FIG. 6, a first node U3 and a second node N4 are in communication through a radio link. It should be particularly noted that the sequence of embodiments illustrated in the Embodiment 5 does not limit the order of how signal transmissions and implementations are arranged in the present disclosure. If there is not conflict, embodiments and subembodiments provided in the Embodiment 6 can also be applied in the Embodiment 5, and vice versa; embodiments, subembodiments and subsidiary embodiments of the Embodiment 5 can be utilized in the Embodiment 6.

The first node U3 transmits a second signal on the first channel in step S30.

The second node N4 receives a second signal on the first channel in step S40.

In Embodiment 6, the first Modulation and Coding Scheme is a modulation and coding scheme of the second signal.

In one embodiment, the second signal comprises control information, and the first signal comprises data.

In one embodiment, the second signal is Uplink Control Information (UCI).

In one embodiment, the second signal is used to indicate a time-domain resource occupied by the first signal.

In one embodiment, the second signal is used to indicate a frequency-domain resource occupied by the first signal.

In one embodiment, the second signal is used to indicate a Hybrid Automatic Repeat reQuest (HARQ) process ID employed by the first signal.

In one embodiment, the second signal is used to indicate a Redundancy Version (RV) employed by the first signal.

In one embodiment, the first candidate parameter is used to determine a first candidate MCS set out of the Q1 candidate MCS sets, the first candidate MCS set comprising the MCS employed by the first signal, and the second signal is used to indicate the MCS employed by the first signal from the first candidate MCS set.

In one subembodiment, the first candidate MCS set comprises K2 MCSs, and the first signal is used to indicate an MCS employed by the first signal out of the K2 MCSs.

In one subsidiary embodiment of the above subembodiment, the first signal comprises a first field, and the first field is used to indicate an MCS employed by the first signal out of the K2 MCSs.

In one subsidiary embodiment of the above subembodiment, the first signal comprises a first field, and a number of bits comprised in the first field is equal to $[\log_2(K2)]$, with $[X]$ representing a minimum integer no less than X.

Embodiment 7

Embodiment 7 illustrates a schematic diagram of a first reference signal, a second reference signal and a first signal, as shown in FIG. 7. FIG. 7 depicts how the first reference signal, the first signal and the second reference signal are mapped in a Physical Resource Block (PRB). Each small box in this figure is a Resource Element (RE). As illustrated in FIG. 7, the time-domain density of the first reference signal is equal to 2, which means that the first reference signal exists on an OFDM symbol out of every two OFDM symbols.

Embodiment 8

Embodiment 8 illustrates a schematic diagram of a second signal, as shown in FIG. 8. FIG. 8 describes a mapping mode of the second signal in a PRB. Each small box in this figure is a Resource Element (RE). As illustrated in FIG. 8, the time-domain position of the second signal is fixed.

In one embodiment, the second signal is generated by a characteristic sequence.

In one embodiment, the second signal comprises Cyclic Redundancy Check (CRC).

In one embodiment, the number of REs occupied by the second signal is fixed.

In one embodiment, the number of information bits carried by the second signal is fixed.

Embodiment 9

Embodiment 9 illustrates a schematic diagram of Q1 candidate parameters; as shown in FIG. 9. In FIG. 9, the Q1 candidate parameters respectively correspond to Q1 first-type beamforming vectors.

In one embodiment, the Q1 first-type beamforming vectors respectively correspond to Q1 spatial Rx parameters, and the Q1 spatial Rx parameters are used by the second node for receiving respectively on the Q1 first-type beamforming vectors.

In one embodiment, the Q1 first-type beamforming vectors respectively correspond to Q1 spatial Tx parameters, and the Q1 spatial Tx parameters are used by the first node for transmitting respectively on the Q1 first-type beamforming vectors.

In one embodiment, the Q1 candidate parameters are respectively associated with Q1 CSI-RS resources.

In one embodiment, the Q1 candidate parameters are respectively associated with Q1 SSB resources.

In one embodiment, the Q1 candidate parameters are respectively associated with Q1 SRS resources.

Embodiment 10

Embodiment 10 illustrates a schematic diagram of Q1 MCSs; as shown in FIG. 10. In FIG. 10, the Q1 MCSs are respectively modulation and coding schemes from MCS #1 to MCS #Q1, and the Q1 candidate parameters respectively correspond to candidate parameter #1 through candidate parameter #Q1; the MCS #1-MCS #Q1 correspond to the candidate parameters #1-#Q1, respectively.

Embodiment 11

Figure 11:
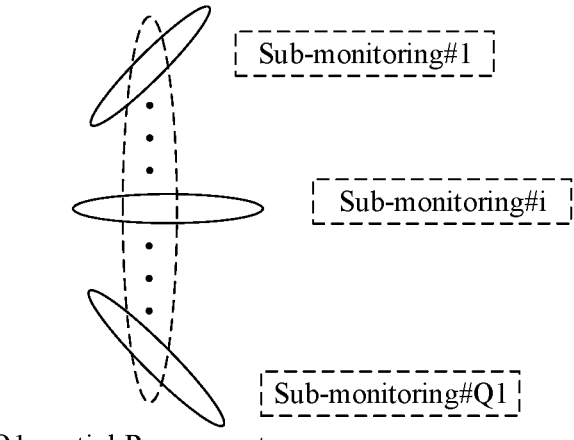
FIG. 11 illustrates a schematic diagram of first monitoring according to one embodiment of the present disclosure.

Embodiment 11 illustrates a schematic diagram of first monitoring, as shown in FIG. 11. In FIG. 11, the first monitoring in the present disclosure comprises Q1 sub-monitorings, and the Q1 sub-monitorings are performed respectively on Q1 spatial Rx parameters corresponding to the Q1 candidate parameters; sub-monitoring #1 through sub-monitoring #Q1 illustrated by FIG. 11 correspond to the Q1 sub-monitorings, respectively.

In one embodiment, the Q1 sub-monitorings are performed independently.

In one embodiment, the Q1 sub-monitorings are Q1 independent LBTs, respectively.

In one embodiment, there are at least two sub-monitorings of the Q1 sub-monitorings whose start times are different.

Embodiment 12

Figure 12:
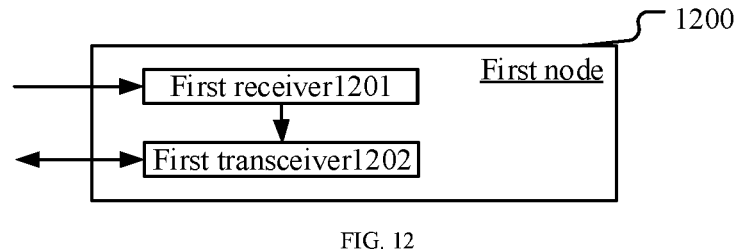
FIG. 12 illustrates a structure block diagram of a processing device in a first node according to one embodiment of the present disclosure.

Embodiment 12 illustrates a structure block diagram of a processing device in a first node, as shown in FIG. 12. In FIG. 12, a first node 1200 comprises a first receiver 1201 and a first transceiver 1202.

The first receiver 1201 receives a first information block;

the first transceiver 1202 transmits a first signal, a first reference signal and a second reference signal on a first channel.

In Embodiment 12, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal; the first information block indicates Q1 candidate parameters, and the Q1 candidate parameters are configured for the first channel; a first candidate parameter is one of the Q1 candidate parameters, and the first candidate parameter is used to transmit the first reference signal and the first signal; the Q1 candidate parameters are associated with Q1 MCSs respectively; at least one of the Q1 MCSs is the same as the first MCS, Q1 being a positive integer greater than 1.

In one embodiment, the first transceiver 1202 transmits a second signal on the first channel; the first MCS is an MCS employed by the second signal.

In one embodiment, the second signal occupies a time-frequency resource other than a time-frequency resource occupied by the first reference signal, and the small-scale fading channel parameters experienced by the second reference signal are used to infer the small-scale fading channel parameters experienced by the second signal.

In one embodiment, the first Modulation and Coding Scheme is one of the Q1 MCSs being associated with the first candidate parameter.

In one embodiment, among the Q1 MCSs there isn't any MCS with higher MCS index than the first MCS.

In one embodiment, the first transceiver 1202 performs a first monitoring on a first sub-band; the first monitoring is used to determine that the first channel can be used to transmit a radio signal, the first channel belonging to the first sub-band in frequency domain.

In one embodiment, the Q1 candidate parameters are respectively associated with Q1 candidate MCS sets, and the Q1 MCSs are respectively MCSs with maximum indexes comprised in the Q1 candidate MCS sets.

In one embodiment, the first candidate parameter is used to determine a first candidate MCS set out of the Q1 candidate MCS sets, the first candidate MCS set comprising the MCS employed by the first signal, and the second signal is used to indicate the MCS employed by the first signal from the first candidate MCS set.

In one embodiment, the first receiver 1201 comprises at least the first four of the antenna 452, the receiver 454, the multi-antenna receiving processor 458, the receiving processor 456 and the controller/processor 459 in Embodiment 4.

In one embodiment, the first transceiver 1202 comprises at least the first six of the antenna 452, the transmitter/receiver 454, the multi-antenna transmitting processor 457, the transmitting processor 468, the multi-antenna receiving processor 458, the receiving processor 456 and the controller/processor 459 in Embodiment 4.

Embodiment 13

Figure 13:
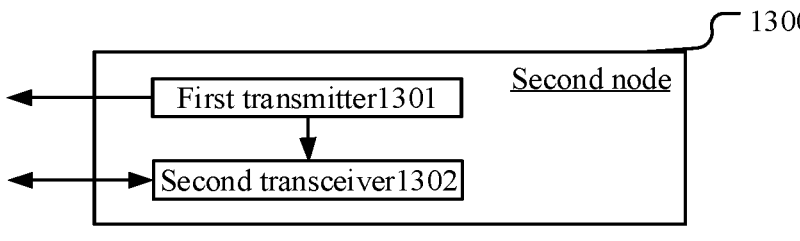
FIG. 13 illustrates a structure block diagram of a processing device in a second node according to one embodiment of the present disclosure.

Embodiment 13 illustrates a structure block diagram of a processing device in a second node, as shown in FIG. 13. In FIG. 13, a second node 1300 comprises a first transmitter 1301 and a second transceiver 1302.

The first transmitter 1301 transmits a first information block;

the second transceiver 1302 receives a first signal, a first reference signal and a second reference signal on a first channel.

In Embodiment 13, small-scale fading channel parameters experienced by the second reference signal are used to infer small-scale fading channel parameters experienced by the first signal; the first reference signal is associated with at least one antenna port of the second reference signal, a first Modulation and Coding Scheme (MCS) is used to determine time-domain density of the first reference signal, and the first MCS is different from an MCS employed by the first signal; the first information block indicates Q1 candidate parameters, and the Q1 candidate parameters are configured for the first channel; a first candidate parameter is one of the Q1 candidate parameters, and the first candidate parameter is used to transmit the first reference signal and the first signal; the Q1 candidate parameters are associated with Q1 MCSs respectively; at least one of the Q1 MCSs is the same as the first MCS, Q1 being a positive integer greater than 1.

In one embodiment, the second transceiver 1302 receives a second signal on the first channel; the first MCS is an MCS employed by the second signal.

In one embodiment, the second signal occupies a time-frequency resource other than a time-frequency resource occupied by the first reference signal, and the small-scale fading channel parameters experienced by the second reference signal are used to infer the small-scale fading channel parameters experienced by the second signal.

In one embodiment, the first Modulation and Coding Scheme is one of the Q1 MCSs being associated with the first candidate parameter.

In one embodiment, among the Q1 MCSs there isn't any MCS with higher MCS index than the first MCS.

In one embodiment, the second transceiver 1302 performs a second monitoring in a first sub-band; the second monitoring is used to determine the first candidate parameter, the first candidate parameter is used for reception of the first channel, and the first channel belongs to the first sub-band in frequency domain.

In one embodiment, the Q1 candidate parameters are respectively associated with Q1 candidate MCS sets, and the Q1 MCSs are respectively MCSs with maximum indexes comprised in the Q1 candidate MCS sets.

In one embodiment, the first candidate parameter is used to determine a first candidate MCS set out of the Q1 candidate MCS sets, the first candidate MCS set comprising the MCS employed by the first signal, and the second signal is used to indicate the MCS employed by the first signal from the first candidate MCS set.

In one embodiment, the first transmitter 1301 comprises at least the first four of the antenna 420, the transmitter 418, the multi-antenna transmitting processor 471, the transmitting processor 416 and the controller/processor 475 in Embodiment 4.

In one embodiment, the second transceiver 1302 comprises at least the first six of the antenna 420, the transmitter/ receiver 418, the multi-antenna transmitting processor 471, the transmitting processor 416, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) comprising:
a transceiver configured to receive an information block, wherein the information block indicates candidate parameters for a channel, wherein the candidate parameters are associated with respective Modulation and Coding Schemes (MCSs);
the transceiver configured to transmit a first signal, a first reference signal, and a second reference signal on the channel, wherein the first reference signal and the first signal are transmitted using a first one of the candidate parameters and a first one of the MCSs that is associated with the first one of the candidate parameters, wherein the first reference signal is associated with at least one antenna port of the second reference signal.

2. The UE of claim 1, the transceiver further configured to transmit a second signal on the channel using the first one of the candidate parameters.

3. The UE of claim 2, wherein the second signal occupies a first time-frequency resource that is different from a second time-frequency resource occupied by the first reference signal.

4. The UE of claim 2, wherein the candidate parameters are associated with respective candidate MCS sets, and each one of the respective candidate MCS sets comprises a respective one of the MCSs that is associated with one of the candidate parameters.

5. The UE of claim 4, wherein the first one of the candidate parameters is used to determine a first one of the candidate MCS sets, wherein the first one of the candidate MCS sets comprises the first one of the MCSs, and the second signal is used to indicate the first one of the MCSs.

6. The UE of claim 2, wherein the second signal comprises Uplink Control Information (UCI), wherein the second signal is used to indicate at least one of: a time-domain resource occupied by the first signal, a frequency-domain resource occupied by the first signal, a Hybrid Automatic Repeat reQuest (HARQ) process number associated with the first signal, or a Redundant Version (RV) associated with the first signal.

7. The UE of claim 1, the transceiver configured to monitor a sub-band;

the UE further comprising a processor configured to determine, based on the monitored sub-band, that the channel can be used to transmit a radio signal, wherein the channel belongs to the monitored sub-band in a frequency domain.

8. The UE of claim 1, wherein the first signal comprises codewords of two different MCSs, wherein the first reference signal is associated with an antenna port with a lowest index among antenna ports of an antenna port set.

9. The UE of claim 1, wherein the first one of the MCSs is an MCS with a highest code rate among the MCSs associated with the candidate parameters.

10. The UE of claim 1, wherein the first one of the MCSs is an MCS with a highest modulation order among the MCSs associated with the candidate parameters.

11. A base station for wireless communications, comprising:

a transceiver configured to transmit an information block, wherein the information block indicates candidate parameters for a channel, wherein the candidate parameters are associated with respective Modulation and Coding Schemes (MCSs);

the transceiver configured to receive a first signal, a first reference signal, and a second reference signal on a channel, wherein the first reference signal and the first signal are transmitted using a first one of the candidate parameters and a first one of the MCSs that is associated with the first one of the candidate parameters, wherein the first reference signal is associated with at least one antenna port of the second reference signal.

12. The base station of claim 11, the transceiver configured to receive a second signal on the channel, wherein the second signal is transmitted using the first one of the candidate parameters.

13. The base station of claim 12, wherein the second signal occupies a first time-frequency resource that is different from a second time-frequency resource occupied by the first reference signal.

14. The base station of claim 12, wherein the candidate parameters are associated with respective candidate MCS sets, and each one of the respective candidate MCS sets comprises a respective one of the MCSs that is associated with one of the candidate parameters.

15. The base station of claim 14, wherein the first one of the candidate parameters is used to determine a first one of the candidate MCS sets, wherein the first one of the candidate MCS sets comprises the first one of the MCSs, and the second signal is used to indicate the first one of the MCSs.

16. The base station of claim 15, wherein the second signal comprises Uplink Control Information (UCI), wherein the second signal is used to indicate at least one of: a time-domain resource occupied by the first signal, a frequency-domain resource occupied by the first signal, a HARQ process number associated with the first signal, or a Redundant Version (RV) associated with the first signal.

17. A method performed by a USER Equipment (UE), the method comprising:

receiving an information block, wherein the information block indicates candidate parameters for a channel, wherein the candidate parameters are associated with respective Modulation and Coding Schemes (MCSs); and transmitting a first signal, a first reference signal, and a second reference signal on the channel, wherein the first reference signal and the first signal are transmitted using a first one of the candidate parameters and a first one of the MCSs that is associated with the first one of the candidate parameters, wherein the first reference signal is associated with at least one antenna port of the second reference signal.

18. The method of claim 17, further comprising:
transmitting a second signal on the channel using the first one of the candidate parameters.

19. The method of claim 18, wherein the second signal occupies a first time-frequency resource that is different from a second time-frequency resource occupied by the first reference signal.

20. The method of claim 17, the method further comprising:

monitoring a sub-band; and determining, based on the monitored sub-band, that the channel can be used to transmit a radio signal, wherein the channel belongs to the monitored sub-band in a frequency domain.

* * * * *